United States Patent [19]
Pitts et al.

[11] 3,722,362
[45] Mar. 27, 1973

[54] INSIDE PIPE BURR REMOVAL TOOL

[75] Inventors: Ralph W. Pitts, Pleasant Grove; McKinley B. Thomas, Orem, both of Utah

[73] Assignee: United States Steel Corporation, Pittsburgh, Pa.

[22] Filed: Nov. 1, 1971

[21] Appl. No.: 194,277

[52] U.S. Cl. ............... 90/24 B, 15/104.16, 90/38 A
[51] Int. Cl. ............................................. B23d 1/16
[58] Field of Search .................... 15/93 R, 104.03, 15/104.05, 104.16; 29/81 R, 81 J, 29/81 G; 83/178, 184, 188, 191, 914; 90/24 B, 24 R, 38 A

[56] References Cited

UNITED STATES PATENTS

| | | | |
|---|---|---|---|
| 1,927,391 | 9/1933 | Coberly et al. | 90/24 B |
| 3,331,286 | 7/1967 | Berquist | 90/24 B |

Primary Examiner—Edward L. Roberts
Attorney—Donald S. Ferito

[57] ABSTRACT

Tool includes a frame having a substantially U-shape opening adjacent one edge for receiving the wall of a welded pipe having an inside burr therealong. The tool is adapted to be suspended in vertical position from an overhead support for movement toward and away from the interior of the end of a pipe and includes a reciprocating tool carriage mounted in its U-shape opening. The carriage is attached to and powered by a pressure fluid cylinder, mounted on the frame, for movement along a way in the U-shape opening. A cutter projects from the tool carriage and is adapted to remove the burr when the tool carriage is moved from a position adjacent the open end of the U-shape opening to a position inwardly of the open end of the opening. A pair of fluid cylinder actuated shoes is provided on the frame for engaging the outer contour of the pipe so as to clamp it between the pair of shoes and another pair of shoes which depend from the tool carriage and engage the inner contour of the pipe astride the burr. Thus the pipe is firmly held when the cutting tool is moved to cut away the end portion of the inside burr.

6 Claims, 6 Drawing Figures

FIG. 2.
FIG. 3.
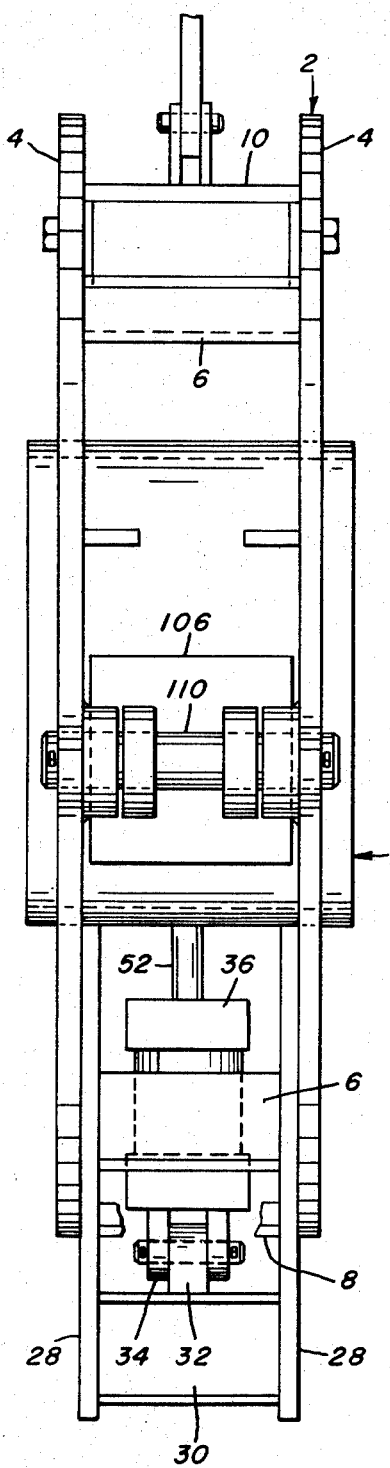
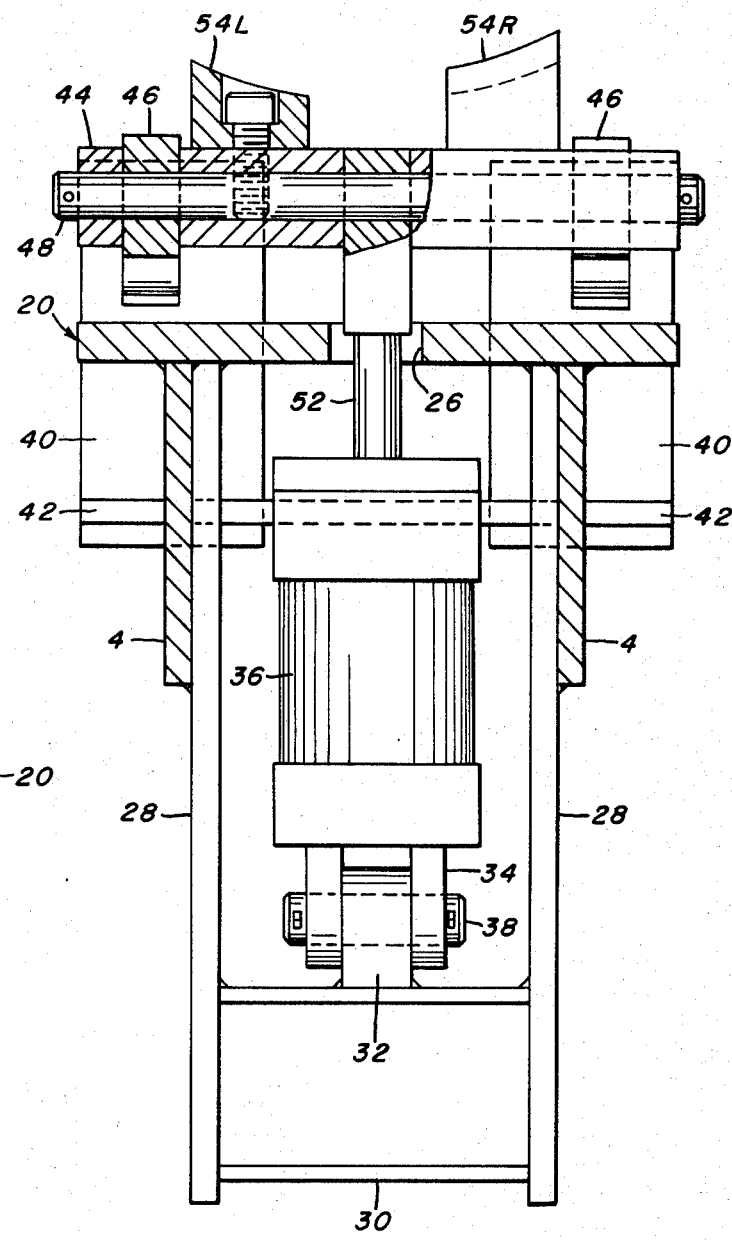

INSIDE PIPE BURR REMOVAL TOOL

The present invention relates generally to de-burring tools and more particularly to a powered de-burring tool especially suitable for removing a portion of the inside burr of large diameter welded pipe adjacent the end thereof so as to facilitate the placement of aligning devices for subsequent pipe joining operations.

As is well known in the art, large diameter pipe of approximately 20-inch diameter or larger is made from steel plate formed by hydraulic presses and welded into a cylinder open on both ends. The welding process usually utilizes a submerged arc with a continuous wire feed which leaves a burr or bead on the inside of the pipe extending along the length thereof. In order to prepare such pipe for subsequent coupling operations, it has been the usual practice to remove approximately 7 inches of the weld burr from the inner surface of each end of the pipe by using hand chipping tools and grinding wheels. Obviously, this method of removing the end portion of the weld burr or bead was not only time consuming and consequently expensive but also dangerous as well.

The primary object of this invention is to provide a power tool for removing the inside weld burr or bead at the end of a large diameter pipe and thus eliminate the slow and expensive hand labor methods heretofore used.

It is a more specific object of the invention to provide a tool for removing the inside burr from the end of a welded pipe which tool comprises a rigid frame made up of two spaced substantially C-shape plates held together in parallel spaced relation by welded bars. The opening of the C-plates is provided with a liner plate welded to the C-plates. The liner plate is substantially U-shape in structure and is provided with a hole in its lower horizontal portion and in its vertical portion. The frame is suspended from an overhead support for movement therealong with its opening directed along the path of movement of the frame. A first pair of shoe members is mounted on the frame below the U-shape plate connected with a fluid pressure cylinder for movement to and from the opening in the bottom portion of the U-shape liner plate. The shoe members are provided with an arcuate upper surface for engaging the outer contour of a pipe end received in the opening of the frame. A tool carriage is mounted in a way attached to the upper horizontal portion of the liner plate for longitudinal reciprocal movement in the frame opening. The carriage carries a cutting tool projecting downwardly therefrom for engaging and cutting away the burr on the inside of the pipe. A second pair of shoes each having an arcuate surface for contacting the inner contour of the pipe depends from the carriage in spaced parallel relation one on each side of the burr. The way is constructed so that the wheel-mounted carriage is elevated when the carriage is moved in the direction outwardly of the liner so that the cutting tool is disengaged from the burr when the carriage is in position toward the open end of the liner. On inward movement of the carriage relative to the open end of the liner, the cutter tool engages the burr and cuts it away from the inner wall of the pipe. A fluid pressure cylinder is connected with a flange depending from the inward end of the carriage for moving the same along the way.

These and other objects will become more apparent after referring to the following specification and drawing in which:

FIG. 2 is an end elevational view looking at the right side of FIG. 1;

FIG. 3 is an enlarged vertical-sectional view taken substantially along the line III—III of FIG. 1;

Figure 1:
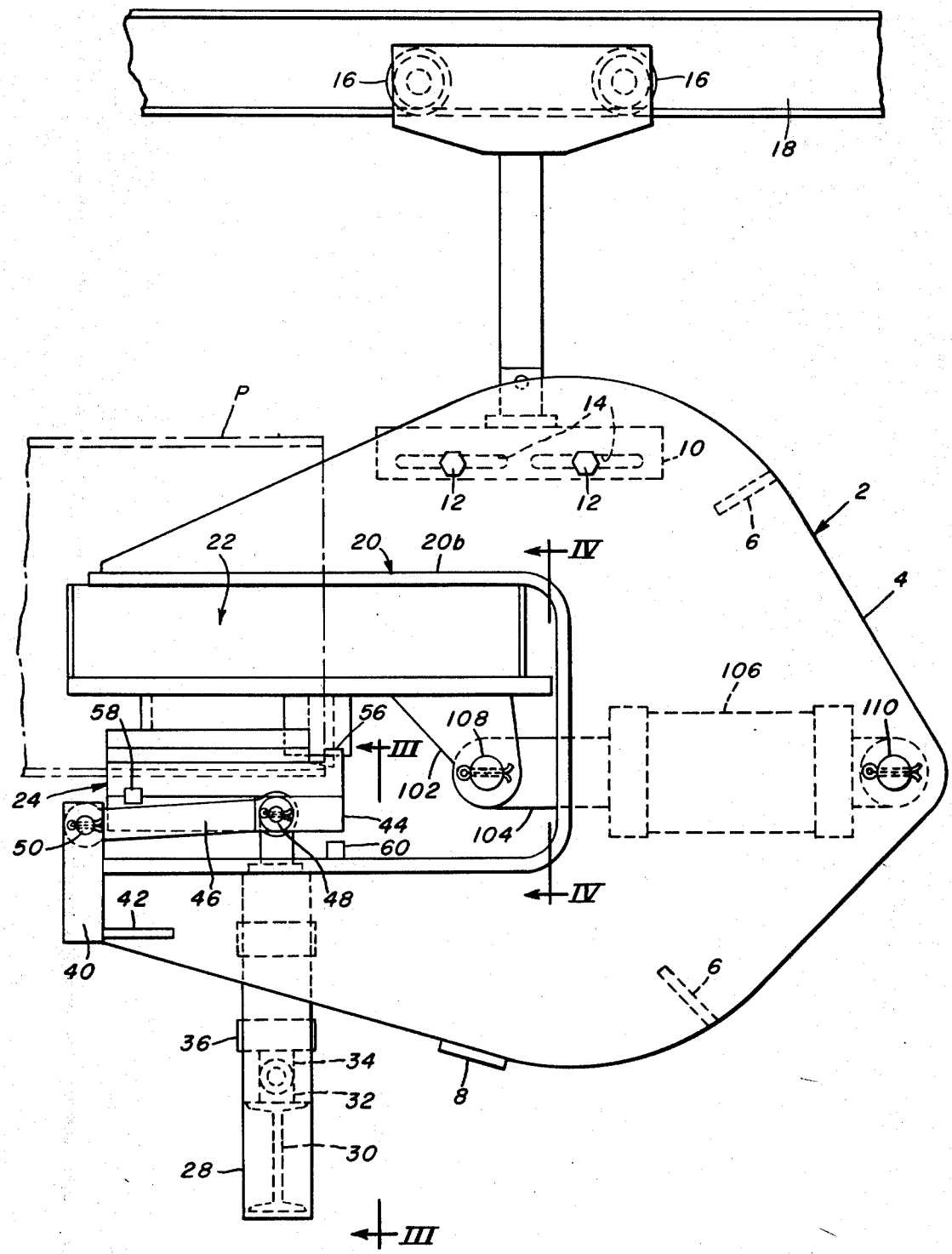
FIG. 1 is a front elevational view of the tool of the invention showing the tool suspended from an overhead beam for horizontal travel therealong.
Figure 4:
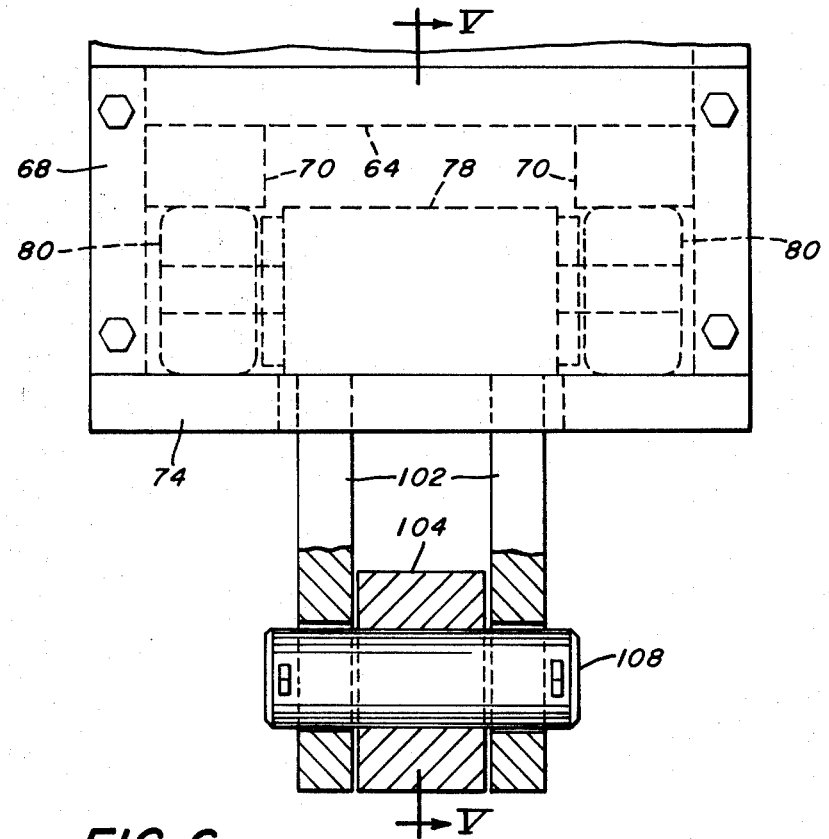
FIG. 4 is an enlarged vertical-sectional view taken substantially along the line IV—IV of FIG. 1.

Referring more particularly for the time being to FIGS. 1 and 2, reference numeral 2 designates generally the frame of the invention which is made up of two C-shape plates 4 spaced apart by bars 6 and 8 which are welded to the respective plates 4. The frame 2 is bolted to a supporting bracket 10 by means of bolts 12 which fit in elongated slots 14 in the supporting bracket 10. The elongated slots 14 provide for horizontal adjustment of the bolts so that the frame 2 may be maintained in a stable horizontal position. The upper portion of the supporting bracket 10 is provided with flange wheels 16 which are mounted for movement along an overhead H-beam 18.

A U-shape liner plate 20 is welded into the openings of the C-shape plates 4, as best shown in FIG. 1. The liner plate 20 provides structural rigidity to the frame as well as support for a tool carriage assembly, designated generally by reference numeral 22, and a lower pipe engaging shoe assembly, designated generally by reference numeral 24. As will be apparent from FIG. 1, the frame 2 is adapted to move along the overhead beam 18 to receive an end of a pipe P within the U-shape liner plate 20 between the carriage assembly 22 and the bottom shoe assembly 24.

Referring now to FIGS. 1 and 3, the bottom shoe assembly, designated generally by reference numeral 24, includes a hole 26 in the lower horizontal portion of the liner plate 20 flanked by a pair of downwardly depending plates 28. The plates 28 are connected at their bottom ends by an I-beam 30 having a drilled bearing block 32 on its upper surface adapted to pivotally support, by means of a pin 38, the bifurcated head end 34 of a hydraulic cylinder 36.

Bearing blocks 40 which are bifurcated and drilled are welded to the plates 4 and the liner 20 on opposing ends of the lower horizontal portion of the liner plate 20 and, as best shown in FIG. 1, extend upwardly above the surface of the lower horizontal portion of the liner. Gussets 42 welded to the plates 4 and blocks 40 serve as stiffening members.

A platen member 44 is mounted above the bottom horizontal leg of the liner 20 by means of a pair of links 46 one on each side of the platen 44, as best shown in FIGS. 1 and 3. The links are pivotally connected at one end with the platen 44 by means of a pin 48 which extends through the end of the platen disposed inwardly of the liner 20. The opposite ends of the links 46 are attached one to each of the bearing blocks 40 by means of a pin 50. The piston rod 52 of the cylinder 36 is pivotally mounted on the pin 48 centrally the width of the platen 44.

A pair of pipe contacting shoes 54R and 54L are bolted to the platen in spaced parallel relationship and project upwardly therefrom, as best shown in FIG. 3. The shoes 54R and 54L have arcuate faces conforming to the outer contour of the pipe P. The shoes 54R and 54L are elongated and at their inner ends, as viewed in FIG. 1, are each formed with a raised stop member 56, the function of which will become apparent hereinafter. It will be understood that different sizes of shoes will be required for different pipe sizes. The replacement of the shoes 54R and 54L is facilitated by the bolt connection means with the platen, as best shown in FIG. 3. The shoes 54R and 54L are maintained in registered position by means of a key 58 which extends across the width of the platen 44 and is interlocked with both the platen and the shoes. As best shown in FIG. 1, it will be noted that since the platen 44 is pivoted about the pin 48, the platen normally assumes a canted position. As the frame 2 is moved into operating position, the stops 56 on the ends of the shoes contact the end of the pipe causing the platen 44 to rotate into a horizontal position bringing shoes 54R and 54L into full contact with the outer surface of the pipe. A stop-bar 60 on the liner plate 20 serves to establish a minimum cant to the platen 44.

The carriage assembly, designated generally by reference numeral 22, includes an elongated carriage way 62 bolted to the upper horizontal portion 20b of the liner 20 which has a substantially rectangular cross section and extends longitudinally of the liner 20. The carriage way 62 includes a top portion 64, two opposing sidewalls 66 and end walls 68. A pair of cam surfaces 70 are bolted to the top 64, one adjacent each of the sidewalls 66. The ends 72 of each of the cam surfaces 70 adjacent the open end of the liner 20 are directed upwardly for a purpose which will become apparent. The carriage way 62 also includes a bottom plate 74 which is formed with a center slot 76. An elongated tool carriage 78 having a pair of spaced rollers 80 at each end is mounted for reciprocal movement along the carriage way 62 with the rollers 80 contacting the upper cam surfaces 70 and the bottom 74 of the carriage way on each side of the slot 76. The carriage 78 is provided with laterally extending guide plates 82, each having wear plates 84 affixed to the outer surface thereof by means of screws 86. The guide plates 82 project from opposite sides of the body of the carriage 78 and slide along the sidewalls 66 of the carriage way 62 thereby preventing lateral displacement of the carriage.

A tool holder 88 is connected with the bottom of the tool carriage by means of bolts 90 and contains a reversible cutting tool 92 which is adapted to contact and cut away the burr B on the inside of the pipe P. The cutting tool 92 is adjustable relative to the tool holder 88 by means of a screw 94 and is locked in adjusted position by means of screws 96.

Figure 6:
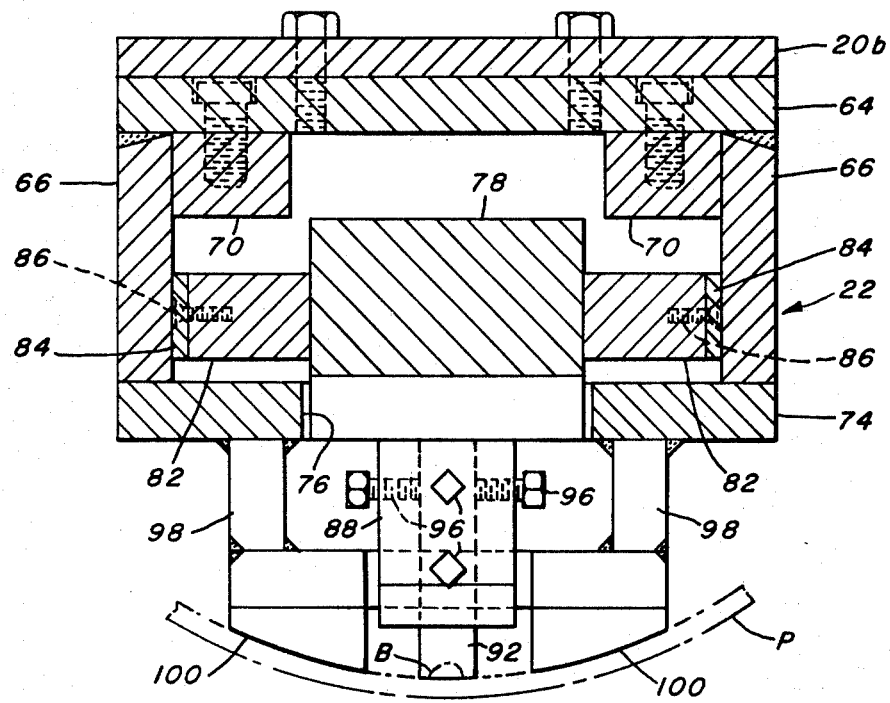
FIG. 6 is a vertical-sectional view taken substantially along the line VI—VI of FIG. 5.

As best shown in FIG. 6, a pair of plates 98 are welded to and depend from the bottom 74 of the carriage way 62, one on either side of the slot 76. On the bottoms of each of the depending plates 98 is welded a shoe 100 which has an arcuate bottom surface conforming to the contour of the inner wall of the pipe P on either side of the burr B.

The end of the carriage 78 inwardly of the opening of the liner 20 is formed with a bifurcated depending flange 102 which is pivotally connected with a piston rod 104 of a hydraulic cylinder 106 by means of a pin 108. The head end of the cylinder 106 is pivotally connected to a pin 110 extending through a suitable opening in the plates 4.

The end portion of the carriage way bottom 74 is provided with an inclined plane 112 one on each side of the slot 76 adjacent the open end of the liner 20 for a purpose which will become more apparent hereinafter.

Figure 5:
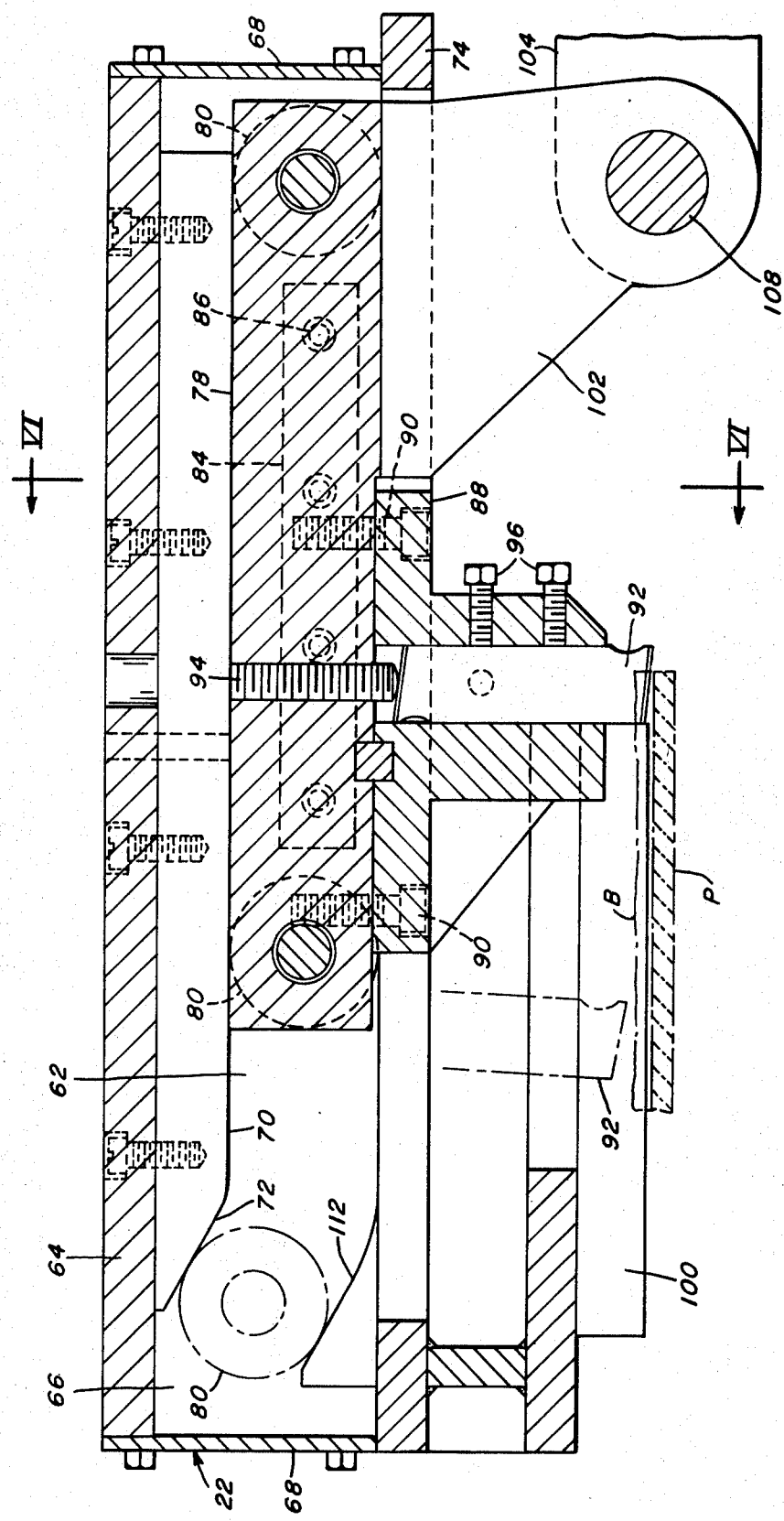
FIG. 5 is a longitudinal-sectional view taken substantially along the line V—V of FIG. 4.

In operation, cylinder 36 is in its retracted position preparatory to the advancement of the tool toward a pipe, the interior of the end of which is to be de-burred. In this arrangement the platen 44 assumes its normal canted position with its right-hand end, as viewed in FIG. 1, resting upon the stop-bar 60 so that the stops 56 on the shoes 54 are elevated above the other portions of the platen 44. The cylinder 106 is actuated to extend its piston rod 104 so that the tool carriage 78 is in extreme left position as viewed by broken lines in FIG. 5 in the carriage way 62. In this position the left end rollers 80 are on the inclined plane 112 and the left end of the carriage 78 is raised, as viewed in FIG. 5, causing the tool 92 to be lifted out of cutting position. With the elements positioned as just described, the frame 2 is moved along the beam 18 toward the end of pipe P supported to overhang the end of a suitable table or conveyor (not shown). The pipe P is positioned with its welded seam down. Forward movement of the frame 2 is arrested when the stops 56 engage the end of the pipe. Cylinder 36 is then actuated to project the piston 52 to bring shoes 54R and 54L to bear against the outside surface of the pipe astraddle the weld. Cylinder 106 is then actuated to retract the piston rod 104 to draw the tool carriage 78 along the carriage way 62 to trim off the excess burr from the interior weld bead. After this is done the cylinder 36 is actuated to release clamping pressure, the frame 2 is retracted from the pipe by moving it along the beam 18 and the cylinder 106 is actuated to return the tool carriage 78 to "start" position, as shown by broken lines in FIG. 5, preparatory to the next de-burring operation.

While we have shown but one embodiment of our invention, other adaptations and modifications may be made without departing from the scope of the following claims.

We claim:

1. Apparatus for removing the inside burr from a welded pipe comprising a rigid frame having an open end substantially U-shape opening extending inwardly from one edge thereof, means connected with said frame for supporting it for travel in a horizontal plane with the open end of said U-shape opening extending transversely of the path of travel of said frame, said U-shape opening being adapted to receive therein the wall of a pipe having an inner burr as said frame is moved longitudinally of said pipe, a pair of first shoe members each having an arcuate contacting surface conforming to the outer surface of said pipe carried in spaced relation by said frame for travel to and from said U-shape opening in a path normal thereto, first power means attached to said frame and connected with said first pair of shoe members for moving the same, a tool carriage mounted for reciprocable movement along a horizontal plane containing the major axis of said U-shape opening and coincidental with the pathway of said frame, second power means carried by said frame and connected with said tool carriage for moving the same, a cutting tool adjustably mounted on and projecting from said tool carriage adapted to engage and cut away the inside burr from said pipe when said wall of said pipe is received in said U-shape opening and the outer wall of said pipe below said burr is engaged by said first pair of shoes and said tool carriage is moved longitudinally relative to said pipe.

2. Apparatus as defined by claim 1 including a second pair of spaced substantially parallel shoe members projecting from said tool carriage adapted to engage the interior wall of said pipe one adjacent each side of said burr to thereby clamp said pipe between said first pair of shoe members and said second pair of shoe members, said second pair of shoe members each having an arcuate pipe-contacting surface conforming to the inner contour of said pipe.

3. Apparatus as defined by claim 1 including a way extending along said horizontal plane containing the major axis of said U-shape opening, said tool carriage being wheel mounted for reciprocable travel along said way, said way having a slotted bottom extending therealong for receiving said cutting tool projecting from said tool carriage, the end of said way adjacent the open end of said U-shape opening being elevated above its opposite end whereby said cutting tool is raised above said burr when said tool carriage is in position adjacent the open end of said U-shape opening.

4. Apparatus as defined by claim 3 in which said tool carriage is provided with a flange adjacent the end thereof remote from the open end of said U-shape opening projecting through said slotted bottom of said way, said second power means being in the form of a fluid pressure cylinder having a piston slidable therein and a piston rod attached to said piston and projecting in a path substantially parallel with the path of travel of said tool carriage, the projecting end of said piston rod being connected with said flange for reciprocating said tool carriage along said way.

5. Apparatus as defined by claim 1 in which said first pair of shoe members is rigidly mounted and projecting upwardly from a platen, said platen being mounted on the bottom of said U-shape opening with one end adjacent the open end of said U-shape opening and its opposite end disposed inwardly of the open end of said U-shape opening, said platen being normally positioned with its said opposite end pivotally canted above the level of its end adjacent the open end of said U-shape opening, said first pair of shoes being attached to and projecting upwardly from said platen, said first pair of shoes each including an upwardly projecting stop portion adapted to engage the edge of said pipe as said apparatus is moved toward the same.

6. Apparatus as defined by claim 5 in which said first power means is in the form of a pressure fluid cylinder attached to said frame having a piston slidable therein and a piston rod connected with said piston and projecting from said cylinder, the projecting end of said piston rod being pivotally connected with said platen adjacent the end thereof remote from the open end of said U-shape opening, retraction of said piston rod effecting canting of said opposite end of said platen and the shoes attached thereto away from said pipe wall, and projection of said piston rod effecting upward pivotal canting of said opposite end of said platen and clamping of said pipe wall between said first and second pairs of shoes.

* * * * *